(12) United States Patent
Boudard et al.

(10) Patent No.: US 8,505,319 B2
(45) Date of Patent: Aug. 13, 2013

(54) METHOD FOR CALCULATING AND ADJUSTING THE CONCENTRATION OF ABSORBING FLUID IN AN ABSORPTION AIR CONDITIONING DEVICE, AND ABSORPTION AIR CONDITIONING DEVICE FOR IMPLEMENTING SAID METHOD

(75) Inventors: Emmanuel Boudard, Voisins le Bretonneux (FR); Philippe Marcais, Courbevoie (FR); Julien Berger, Paris (FR); Vital Bruzzo, San Germano Dei Berici (IT)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 777 days.

(21) Appl. No.: 12/679,878

(22) PCT Filed: Sep. 2, 2008

(86) PCT No.: PCT/FR2008/051562
§ 371 (c)(1),
(2), (4) Date: Mar. 24, 2010

(87) PCT Pub. No.: WO2009/044034
PCT Pub. Date: Apr. 9, 2009

(65) Prior Publication Data
US 2010/0192603 A1 Aug. 5, 2010

(30) Foreign Application Priority Data
Sep. 25, 2007 (FR) ...................................... 07 57841

(51) Int. Cl.
*F25B 15/00* (2006.01)
(52) U.S. Cl.
USPC .............................................. 62/141; 62/148
(58) Field of Classification Search
USPC ................ 62/141, 148, 149, 238.3, 476, 497
See application file for complete search history.

(56) References Cited

U.S. PATENT DOCUMENTS 4,596,122 A * 6/1986 Kantner .......................... 62/141
5,477,696 A   12/1995 Takahata
(Continued)

FOREIGN PATENT DOCUMENTS

| JP | 54131160 A | 10/1979 |
| JP | 58096963 A | 6/1983 |
| JP | 59086876 A | 5/1984 |
| JP | 61143665 A | 7/1986 |

(Continued)

OTHER PUBLICATIONS

Search Report from corresponding International Application No. PCT/FR2008/051562, mailed Jun. 2, 2009.

*Primary Examiner* — Chen Wen Jiang
(74) *Attorney, Agent, or Firm* — Polster Lieder Woodruff & Lucchesi, L.C.

(57) ABSTRACT

The invention relates to an absorption air conditioner that comprises a desorber (100), a condenser, an evaporator and an absorber, wherein the absorbing fluid may consist of lithium bromide. The method comprises the following steps: calculating the concentration of the absorbing fluid solution at the outlet of the desorber (100); and comparing the calculated concentration with a predetermined critical value and, if the calculated concentration gets closer to the predetermined critical value, increasing the charge loss in the duct (20) connecting the desorber (100) to the condenser, which interrupts the condensation in the condenser and results in a pressure increase in the desorber that stops the desorption and in a concentration increase, the charge loss being on the other hand reduced for resuming the desorption when the calculated concentration deviates from the predetermined critical value. The invention can be used in automobiles and absorption air-conditioners.

11 Claims, 2 Drawing Sheets

(56) References Cited

U.S. PATENT DOCUMENTS

| | | |
|---|---|---|
| 5,586,447 A | 12/1996 | Sibik |
| 6,192,694 B1 * | 2/2001 | Hiro et al. ............... 62/141 |
| 6,694,772 B2 * | 2/2004 | Inoue et al. ............. 62/497 |

FOREIGN PATENT DOCUMENTS

| | | |
|---|---|---|
| JP | 62069074 A | 3/1987 |
| JP | 62155478 A | 7/1987 |
| JP | 7280384 A | 10/1995 |
| JP | 11230633 A | 8/1999 |

* cited by examiner

METHOD FOR CALCULATING AND ADJUSTING THE CONCENTRATION OF ABSORBING FLUID IN AN ABSORPTION AIR CONDITIONING DEVICE, AND ABSORPTION AIR CONDITIONING DEVICE FOR IMPLEMENTING SAID METHOD

CROSS-REFERENCE TO RELATED APPLICATIONS

The present application is the US national stage under 35 U.S.C. §371 of International Application No. PCT/FR2008/051562 which claims the priority of French application 0757841 filed on Sep. 25, 2007, the content of which (description, claims and drawings) is incorporated herein by reference.

BACKGROUND

This invention concerns a method of calculation and adjustment—also named "control process" in this text—of the absorbing fluid concentration, for example of lithium bromide, in an absorption air-conditioning device.

This invention also involves an absorption air-conditioning device for the implementation of the method.

Finally, this invention involves a vehicle, in particular an automotive vehicle, equipped with such an absorption air-conditioning device.

An absorption air-conditioning device consists diagrammatically of an element in which desorption takes place (denoted "desorber" in the following text), an absorber, a condenser and an evaporator. In order to operate, the desorber and absorber are filled with a mixture of at least two miscible substances formed by a coolant fluid and an absorbing fluid. This mixture is combined in the absorber, in which the absorption of the coolant fluid by the absorbing fluid takes place. The coolant fluid and the absorbing fluid have sufficiently different evaporation pressures so that, when the desorber is heated, the most volatile of the two, that is the coolant fluid, evaporates and changes into a liquid in the condenser.

The desorber receives heat, and this outside contribution permits the evaporation of the liquid coolant from the mixture. This coolant fluid is then condensed in the condenser by cooling. The liquid obtained is trapped and evaporated in the evaporator and thus produces the cold of the air-conditioning. The absorber allows the solution to fix the coolant fluid molecules and, in this way, to maintain a low pressure and, therefore, a low evaporation temperature. The solution/coolant fluid reaction is exothermic. The absorber solution, therefore, must be cooled so that it retains its absorbing power.

BRIEF SUMMARY

A first goal of this invention is to provide a method of calculating and adjusting the concentration of the solution, that means the concentration of absorbing fluid. This permits guaranteeing good control over the risk of crystallization of the aforesaid solution in the entire air conditioning circuit.

Another goal of this invention is to provide such a method, that is faster and as accurate as the known adjustment processes from the prior art.

Another goal of this invention is to provide such a method, that contributes a better reactivity to the air-conditioning device than the one offered by the existing technical solutions.

One goal of this invention is also to provide an absorption air-conditioning device for the implementation of such a method, in which the risk of crystallization of the absorbing fluid in the entire air-conditioning circuit is optimally managed.

Finally, it is also a goal of this invention to provide a vehicle, in particular an automotive vehicle, equipped with such an absorption air-conditioning device which can adjust the absorbing fluid concentration.

To reach these goals, this invention conceives of a new control method of the absorbing fluid concentration in an absorption air-conditioner by including a desorber, a condenser, an evaporator and an absorber. This new process is comprised of the following stages, taken in combination:

- the concentration of the absorbing fluid solution is calculated at the output of the desorber, and
- the concentration calculated is compared to a predetermined critical value. If the calculated concentration approaches the predetermined critical value, the head loss in the duct connecting the desorber to the condenser is increased, thereby shutting down condensation in the condenser and increasing the pressure in the desorber. This causes desorption to stop and increases the concentration of the absorbing fluid solution. The head loss being decreased, on the other hand, restarts desorption, and the calculated concentration moves away from the predetermined critical value.

According to the preferred mode, the concentration of the absorbing fluid solution is calculated at the output of the desorber by measuring, on the one hand, the coolant vapor pressure in the desorber and simultaneously, on the other hand, the temperature of the absorbing fluid solution at the output of the desorber.

According to the equally preferred mode, the calculation of the concentration at the time t is obtained by using the concentration at the time t−1, and by calculating a corrector for concentration by determining the concentration variation between t−1 and t, the aforesaid calculation of the corrector uses the coolant pressure measurement values and solution temperature at time t.

The calculation of the concentration at the time t responds to the following formula:

$$X_t = X_{t-1} - \frac{f(X_t)}{f'(X_t)}$$

in which:

$$f(X) = A(X) \cdot t_e + B(X) - t_s,$$

with $$A(X) = A_3 \cdot X^3 + A_2 \cdot X^2 + A_1 \cdot X + A_0$$

$$B(X) = B_3 \cdot X^3 + B_2 \cdot X^2 + B_1 \cdot X + B_0$$

And $$f'(X) = \frac{dA(X)}{dX} \cdot t_e + \frac{dB(X)}{dX}$$

$$\frac{dA(X)}{dX} = 3 \cdot A_3 \cdot X^2 + 2 \cdot A_2 \cdot X + A_1$$

$$\frac{dB(X)}{dX} = 3 \cdot B_3 \cdot X^2 + 2 \cdot B_2 \cdot X + B_1$$

And $A_i$, $B_i$ (i going from 0 to 3) are the constants pertaining to the absorbing fluid used (lithium bromide, for example).

In a preferential manner, the head loss is increased or decreased in the duct connecting the desorber to the condenser by operating a valve, for example a butterfly valve, arranged inside the aforesaid duct.

By preference, but without restricting the object of this invention, the absorbing fluid is lithium bromide, and the constants $A_i$, $B_i$ (i going from 0 to 3) have the values determined experimentally and pertaining to this type of fluid.

The coolant fluid is, by preference, water.

This invention also provides an absorption air-conditioning device for the implementation of the method in conformity with what is described above in outline. This device includes, in a classic manner, a desorber, a condenser, an evaporator and an absorber. But, the desorber of this new device includes a pressure sensor for the measurement of the vapor pressure of the coolant of the aforesaid desorber and a temperature sensor for measuring the temperature of the absorbing fluid solution at the output of the desorber. Further, this new device includes a means to vary the head loss in the duct conducting the coolant fluid vapor to the condenser.

By preference, the means to vary the head loss in the duct leading the coolant fluid vapor to the condenser is a regulating valve, of the butterfly type.

According to the preferred embodiment, the desorber of the device includes a main heat exchange system of the plates type system, located over the tank of absorbing fluid solution, and a plate exchanger to reheat the solution going into the main thermal exchange system with the solution coming down from the solution tank.

In addition, an additional heating system of the solution, of the electrical resistance type, can bathe in the solution tank.

Finally, the invention supplies a vehicle, by preference an automotive vehicle, characterized in that it includes a absorption air-conditioning device of the type, conforming to the one described above in outline.

BRIEF DESCRIPTION OF THE DRAWINGS

Other goals, advantages and features of the invention shall appear in the description of a preferred mode of embodiment, unrestricted in the object and the scale of this patent application, accompanied by drawings in which.

DETAILED DESCRIPTION

Figure 1:
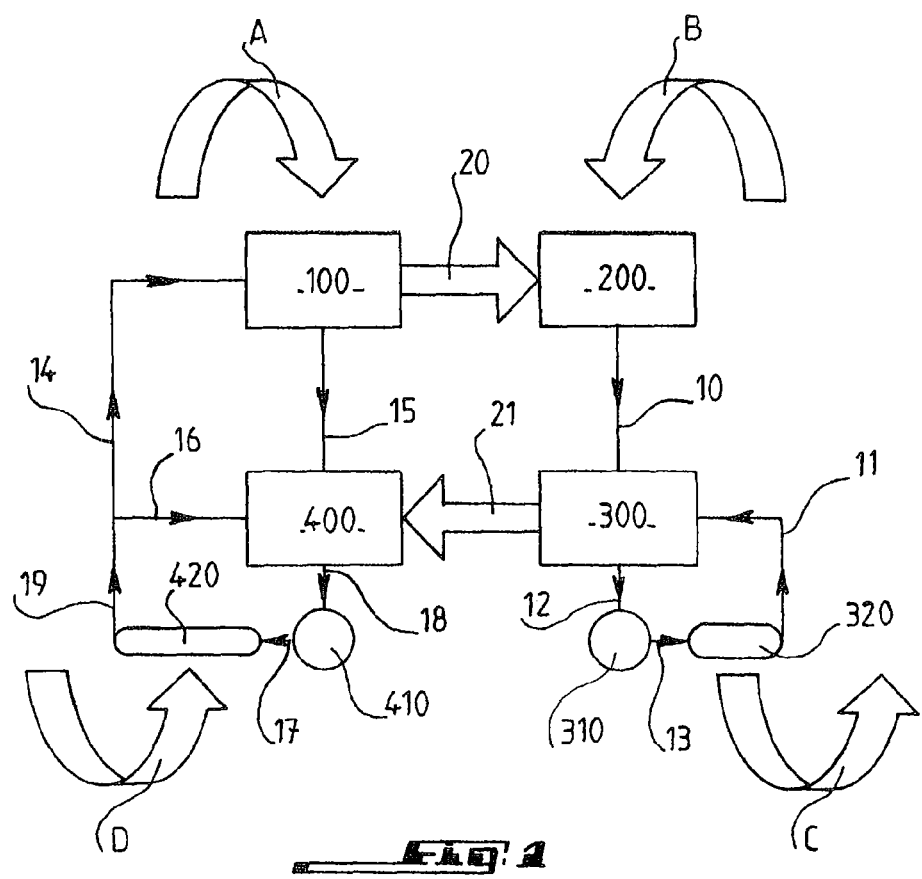
FIG. 1 represents, in a diagrammatic manner, the operating principle and the constituent elements of an absorption air-conditioning device, FIG. 2, also in a diagrammatic manner, represents the desorber of the absorption air-conditioning device of FIG. 1.

In reference to the drawing of FIG. 1, the constituent elements and the operating principle of an absorption air-conditioning device are shown in schematically. It includes, in classic fashion, a desorber 100, a condenser 200, an evaporator 300 and an absorber 400. The motive coolant liquid of the vehicle contributes (contribution illustrated diagrammatically by arrow A) the heat necessary for the separation of a coolant fluid, for example the water vapor, from an absorbing fluid or salt solution, for example a lithium bromide (LiBr) solution.

Water as vapor is then conducted by the piping 20 into the condenser 200 to be condensed by the cooling action of the outside air (cooling contribution illustrated diagrammatically by the arrow B). Water in liquid phase is conducted by the piping 10 into the evaporator 300. The cold produced at the time of the evaporation is transmitted to the cabin of the vehicle (not represented), as illustrated diagrammatically by the arrow C. For this purpose, a pump 310 and a forced convection air cooler 320 are provided, that are joined to the evaporator 300 by the piping 11, 12 and 13. The piping assembly 10 to 13 forms the water circuit in the liquid phase. The water vapor that comes out of the evaporator 300 is brought into the absorber 400 by the piping 21. The solution is cooled by the outside air to absorb the water vapor (cooling contribution illustrated diagrammatically by the arrow D). For this purpose, a pump 410 and a radiator 420 are provided, that are connected to the absorber 400 by the piping 16, 17, 18 and 19. The absorber 400 is connected to the desorber 100 by the piping 14, 15 and 16. The piping assembly 14 to 19 forms the salt solution circuit.

Figure 2:
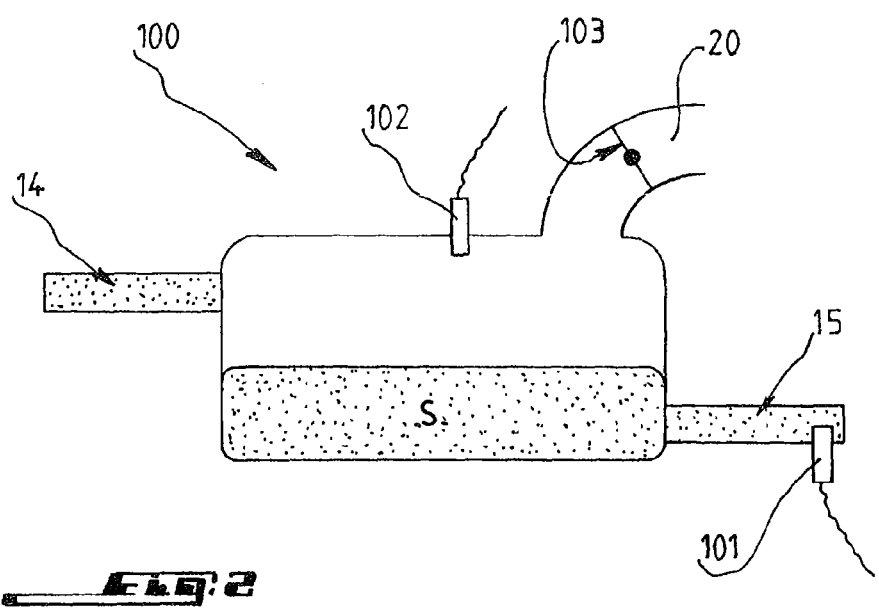

FIG. 2 represents, in a very diagrammatic manner, the desorber 100, with its input 14 and its output 15 for the salt solution, and its outlet piping 20 of the coolant vapor phase leading to the condenser 200.

The concentration of the solution S at the output of the desorber 100 is the highest in the entire circuit of the air-conditioning device.

By concentration of the solution, designated X, one understands the ratio between the mass of absorbing fluid (lithium bromide, for example) and the total mass of the absorbing fluid and cooling fluid mixture of the two fluids.

The concentration of absorbing fluid is determined to depend on the two following physical measurements:

the measurement of the coolant vapor pressure P in the desorber 100 by means of the pressure sensor 102, and the measurement of the temperature ($t_s$) of the solution S at the output of the desorber 100 by means of the temperature probe 101.

Calculation of the Concentration

The concentration X is linked to the temperature of coolant (water) $t_e$ and to the temperature of the solution $t_s$ by the following relationship, designated $R_1$:

$$t_e = \frac{t_s - \sum_{i=0}^{3} B_i \cdot X^i}{\sum_{i=0}^{3} A_i \cdot X^i}$$

In which, the constants have the following values:

| | | | |
|---|---|---|---|
| A0 | −2.007550E+00 | B0 | 1.249370E+02 |
| A1 | 1.697600E−01 | B1 | −7.712490E+00 |
| A2 | 3.133362E−03 | B2 | 1.522860E−01 |
| A3 | 1.976680E−05 | B3 | 7.950900E−04 |

The coolant vapors extracted from the desorber 100 are in the saturated state. Consequently, it is possible to connect the measured pressure P to a coolant temperature $t_e$.

We use, for example, the following formula:

$$\log(P) = C + \frac{D}{t_e + 273.15} + \frac{E}{(t_e + 273.15)^2}$$

With P in kPa (kilo Pascals) and $t_e$ in °C., we have the following relationship, designated $R_2$:

$$t_e = \frac{-D + \sqrt{D^2 - 4 \cdot (C - \log(P)) \cdot E}}{2 \cdot (C - \log(P))} - 273.15$$

in which the constants have the following values:

| | |
|---|---|
| C | 7.05 |
| D | −1596.49 |
| E | −104095.5 |

From the relationship $R_1$ stated previously, we draw:

$$\sum_{i=0}^{3} t_e \cdot A_i \cdot X^i - t_s + \sum_{i=0}^{3} B_i \cdot X^i = 0$$

$$\sum_{i=0}^{3} (t_e \cdot A_i + B_i) \cdot X^i - t_s = 0$$

$$(t_e \cdot A_3 + B_3) \cdot X^3 + (t_e \cdot A_2 + B_2) \cdot X^2 +$$
$$(t_e \cdot A_1 + B_1) \cdot X + (t_e \cdot A_0 + B_0 - t_s) = 0$$

Solution of the Equation.

The temperature $t_e$ is calculated using the pressure measurement and the equation designated $R_2$ stated previously. The temperature $i_s$ is the temperature of the solution S at the output 15 of the desorber 100.

The resolution of the equation $R_1$ normally takes place using an iterative method. In general, three iterations are required to converge on the solution sought. The interest of the method presented is to achieve only a single iteration by taking the starting concentration as determined at time t−1.

We have, therefore, only one equation to solve of the type:

$$X_t = f(X_{t-1}, P, t_s) \text{ or } X_t = f(X_{t-1}, t_e, t_s)$$

If we use a Newton type formula, for example, we obtain a formula $R_1$ equivalent to:

$$f(X) = A(X) \cdot t_e + B(X) - t_s$$

With $$A(X) = A_3 \cdot X^3 + A_2 \cdot X^2 + A_1 \cdot X + A_0$$

$$B(X) = B_3 \cdot X^3 + B_2 \cdot X^2 + B_1 \cdot X + B_0$$

And $$f'(X) = \frac{dA(X)}{dX} \cdot t_e + \frac{dB(X)}{dX}$$

$$\frac{dA(X)}{dX} = 3 \cdot A_3 \cdot X^2 + 2 \cdot A_2 \cdot X + A_1$$

$$\frac{dB(X)}{dX} = 3 \cdot B_3 \cdot X^2 + 2 \cdot B_2 \cdot X + B_1$$

$X_{t-1}$ is the concentration at the acquisition time t−1

$$X_t = X_{t-1} - \frac{f(X_t)}{f'(X_t)}$$

It should be noted that the calculation of f(X) and of f'(X) uses the concentration at time t−1 and the measurements of pressure P of the coolant and temperature $t_s$ of the solution at time t.

In reality, only a concentration corrector is calculated which determines the variation of concentration according to new measured values of pressure and temperature.

The concentration of the solution is fixed at time t=0 as desired. For example, we fix $X_{t=0}$=60%.

The concentration of the solution at time t=0 can also be fixed according to the shut-off strategy used. For example, if one envisages, at the time of the last shut-down, a target concentration of 58%, the concentration at t=0 will be fixed at 58%.

Adjustment of the Concentration.

The calculation of the concentration, as described above, permits controlling the risk of crystallization of the salt solution (LiBr).

According to this invention, the adjustment of the concentration is based on the control of the condensation.

If the calculated concentration approaches a predetermined critical value, the head loss is increased in the duct 20 leading to the condenser 200 by activating, for example, a butterfly valve 103, represented diagrammatically in FIG. 2 at maximum closing position. The shut-down of the condensation causes an increase of the pressure in the desorber 100. This pressure increase stops the desorption and increases the concentration. Conversely, when the concentration moves away from the critical zone, the head loss decreases to restart the desorption.

Design of the Desorber

Figure 3:
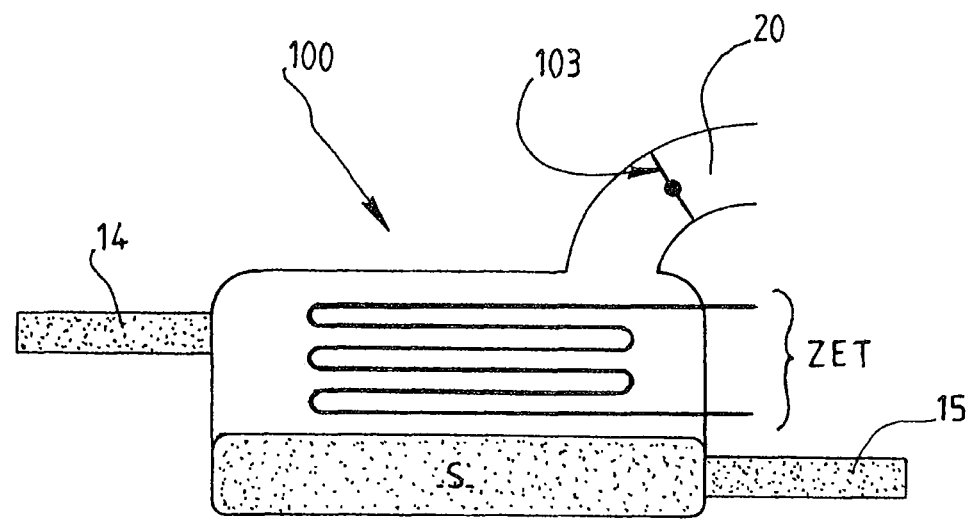
FIG. 3 illustrates, in a diagrammatic manner, the general design principle of a desorber.

In reference to the drawing of FIG. 3, the desorber 100 possesses a minimum reserve level below the referenced thermal exchange zone ZET. When the operating of the device is shut-down, the reserve of the desorber reached this minimum level. Thus, the thermal inertia of the heating system is decreased and the temperature rises throughout the entire circuit at the time of restarting the device.

The previously referenced regulating valve 103 of the desorber performance is used and situated in the piping 20 between the desorber 100 and the condenser 200.

Figure 4:
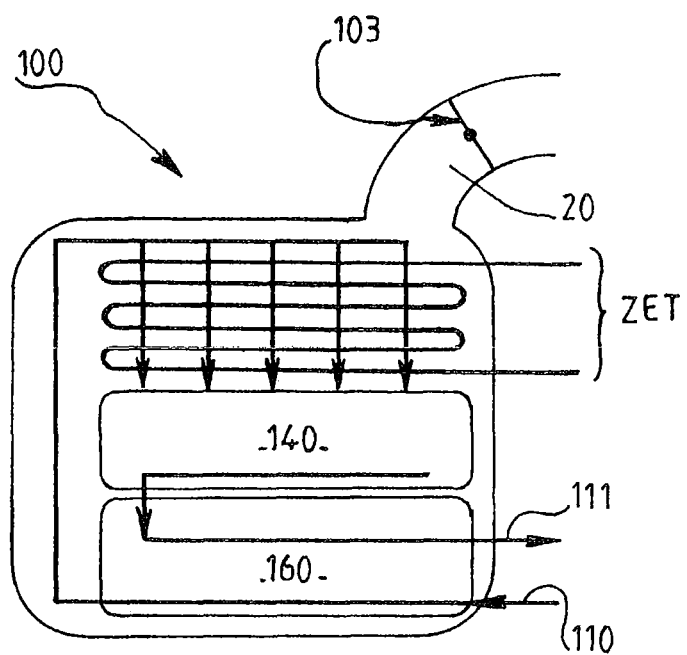
FIG. 4 represents, in a diagrammatic manner, the general design principle of a desorber according to this invention.

In a preferential manner, and in reference to FIG. 4, a compact desorber 100 is used, taking on three functions.

A plate exchanger 160 is incorporated within the desorber 100. The exchanger 160 functions to heat the solution going into the main exchange zone ZET with the solution coming down from the solution tank 140. The solution tank 140 is completely separated from the principal heating system by the coolant liquid of the motor. We can therefore free ourselves from a "by-pass" of the hot water required to permit a fast rise in the motor temperature.

The solution circuit is represented by the arrowed lines of the input 110 at the output 111 of the solution.

An additional heating system of the solution, of an electrical resistance type, not shown in FIG. 4, can bathe in the solution tank 140.

The main exchange system ZET is a plate type system permitting sufficient compaction of the device.

Valve 103, situated in the piping 20 leading to the condenser, permits controlling the concentration more quickly than by adjustment of the power contributed to the desorber 100. Valve 103 also permits dispensing with an adjustment of the exchange capacity of the condenser 200.

If the pressure in the condenser 200 is very low, there is a risk that the coolant cannot circulate from the condenser 200 to the coolant reserve of the absorber 400. Effectively, on an automotive vehicle, an operating difference in level cannot be guaranteed in all cases compatible with a gravity flow between the condensation zone and the evaporation zone. With the solution of this invention, we can open the valve 103 briefly to increase the pressure in the condenser and, thereby, "push" the coolant into the absorber's circuit.

The invention described above presents many advantages, among which are the following advantages:

The calculation method of the absorbing solution concentration stated above is faster and as accurate as the concentration calculation methods of the solutions known from the prior art.

The calculation method of the invention permits managing the risk of crystallization of the absorbing fluid, the lithium bromide for example, in the entire air-conditioning circuit.

The adjustment of the concentration by the control of the condensation contributes a better reactivity to the system. Effectively, the technical solutions known from the prior art generally consist in reducing the energy contribution to the desorber by activation of a valve that regulates the incoming hot water flow. These solutions, because of the thermal inertia brought into play, are a lot less effective than the solution from the invention that proposes a shutdown of the condensation, which shutdown has an almost immediate effect. Further, for an automotive application, the performances of the front panel (and therefore the condenser) can vary widely. The installation of a regulating valve between the desorber and the condenser, in accordance with this invention, permits isolating the condenser from the rest of the air-conditioning circuit.

Of course, this invention is not limited to the mode of embodiment described above as an example; other modes of embodiment can be conceived by a person skilled in the art without leaving the scope and the range of this invention.

The invention claimed is:

1. A method of controlling the concentration of an absorbing fluid in an absorption air-conditioner; the absorption air-condition including a desorber, a condenser, an evaporator and an absorber, and piping interconnecting the desorber, condenser, absorber and evaporator; the method comprising the following steps taken in combination:
    calculating the concentration of the absorbing fluid solution at an output of the desorber, and
    comparing the calculated concentration of the absorbing fluid solution to a predetermined critical value; whereby, if the calculated concentration approaches the aforesaid predetermined critical value, the head loss is increased in a duct connecting the desorber to the condenser thereby causing a shut down of condensation in the condenser and an increase of the pressure in the desorber; and the increase in pressure in the desorber causing a shut down of desorption and an increase in the concentration of the absorbing fluid solution; and wherein, the head loss is decreased to restart desorption when the calculated concentration moves away from the predetermined critical value.

2. The method according to claim 1, wherein the concentration of the absorbing fluid solution is calculated at the output of the desorber by measuring the pressure (P) of coolant vapor in the desorber and simultaneously measuring the temperature ($t_s$) of the absorbing fluid solution at the output of the desorber.

3. The method according to claim 2, wherein the calculation of the concentration at time t is obtained by using the concentration at the time t−1, and by calculating a concentration corrector to determine the variation of concentration between time t−1 and time t, said corrector calculation using the values of the pressure measurement (P) of the coolant and temperature ($t_s$) of the solution at time t.

4. The method according to the claim 3, wherein the concentration calculation at time t answers the following formula:

$$X_t = X_{t-1} - \frac{f(X_t)}{f'(X_t)}$$

in which $$f(X) = A(X) \cdot t_e + B(X) - t_s$$

With $$A(X) = A_3 \cdot X^3 + A_2 \cdot X^2 + A_1 \cdot X + A_0$$

$$B(X) = B_3 \cdot X^3 + B_2 \cdot X^2 + B_1 \cdot X + B_0$$

And $$f'(X) = \frac{dA(X)}{dX} \cdot t_e + \frac{dB(X)}{dX}$$

$$\frac{dA(X)}{dX} = 3 \cdot A_3 \cdot X^2 + 2 \cdot A_2 \cdot X + A_1$$

$$\frac{dB(X)}{dX} = 3 \cdot B_3 \cdot X^2 + 2 \cdot B_2 \cdot X + B_1$$

wherein $t_e$ is the temperature is the temperature of the coolant water;

With $$A(X) = A_3 \cdot X^3 + A_2 \cdot X^2 + A_1 \cdot X + A_0$$

$$B(X) = B_3 \cdot X^3 + B_2 \cdot X^2 + B_1 \cdot X + B_0$$

And $$f'(X) = \frac{dA(X)}{dX} \cdot t_e + \frac{dB(X)}{dX}$$

$$\frac{dA(X)}{dX} = 3 \cdot A_3 \cdot X^2 + 2 \cdot A_2 \cdot X + A_1$$

$$\frac{dB(X)}{dX} = 3 \cdot B_3 \cdot X^2 + 2 \cdot B_2 \cdot X + B_1$$

And $A_i$, $B_i$ (i going from 0 to 3) are the constants used pertaining to the absorbing fluid.

5. The method according to claim 4 wherein the head loss is increased or decreased in the duct connecting the desorber to the condenser by activating a valve arranged inside the duct.

6. The method according to claim 5, wherein the absorbing fluid is lithium bromide and the constants Ai, Bi (for i going from 0 to 3) have the following values:

| | | | |
|---|---|---|---|
| A0 | −2.00550E+00 | B0 | 1.249370E+02 |
| A1 | 1.697600E−01 | B1 | −7.712490E+00 |
| A2 | 3.133362E−03 | B2 | 1.5225860E−01 |
| A3 | 1.976680E−05 | B3 | 7.950900E−04. |

7. The method according to claim 4 wherein $$t_e = \frac{t_s - \sum_{i=0}^{3} B_i \cdot X^i}{\sum_{i=0}^{3} A_i \cdot X^i},$$

and Ai and Bi (i going from 0 to 3) are the constants used pertaining to the absorbing fluid.

8. An absorption air-conditioning device comprising:
a desorber having an inlet for receiving an absorbing liquid, a water vapor outlet and a liquid salt solution outlet; the absorbing liquid in the desorber having a concentration;
a condenser having an inlet in communication with the water vapor outlet of the desorber via a duct to receive a vapor phase from the desorber;
an evaporator having an inlet to receive absorbing liquid solution from the condenser, a vapor outlet and a liquid solution outlet;
an absorber having an inlet in communication with the vapor outlet of the evaporator to receive a water vapor phase from the evaporator and an inlet in communication with the liquid outlet of the desorber to receive a liquid phase from the desorber;
a pressure sensor for the measurement of the pressure (P) inside the desorber and a temperature sensor for the measurement of the temperature ($t_s$) of the absorbing fluid solution at the output of the desorber;
a regulating valve in the duct conducting the vapor phase from the desorber to the condenser; and
a controller for controlling the regulating valve in response to the sensed pressure (P) in the desorber and the temperature ($t_s$) of the liquid phase at the output of the desorber to control head loss in the duct and thus regulate the concentration of the absorbing liquid in the desorber.

9. The absorption air-conditioning device of claim 8, wherein the desorber includes a main thermal exchange system located over a solution tank of absorbing fluid and an exchanger plate to warm the active solution in the main thermal exchange system with the solution coming down from the solution tank.

10. The absorption air-conditioning device according to claim 9, wherein an additional heating system of the solution is positioned in the solution tank.

11. The absorption air-conditioning device of claim 8, wherein the absorption air-condition device is included in a vehicle, by preference automobile vehicle.

* * * * *